United States Patent

[11] 3,580,151

[72] Inventors Kenneth C. Hudson
 Philadelphia, Pa.;
 Fred E. Shashoua, Cherry Hill, N.J.
[21] Appl. No. 768,424
[22] Filed Oct. 17, 1968
[45] Patented May 25, 1971
[73] Assignee The United States of America as
 represented by the Secretary of the Air
 Force

[54] LOW LIGHT LEVEL COLOR PHOTOGRAPHY
 2 Claims, 4 Drawing Figs.
[52] U.S. Cl. .................................................. 95/12.20
[51] Int. Cl. ............................................... G03b 33/00
[50] Field of Search ........................................ 95/12.20;
 250/71

[56] References Cited
 UNITED STATES PATENTS
| | | | |
|---|---|---|---|
| 2,050,417 | 8/1936 | Bocca | 95/12.20X |
| 2,555,545 | 6/1951 | Hunter | 250/71 |
| 2,586,392 | 2/1952 | Sheldon | 250/71X |
| 2,739,257 | 3/1956 | Sheldon | 250/71X |
| 2,790,085 | 4/1957 | Fransen | 250/71X |
| 2,946,255 | 7/1960 | Bolay | 250/71X |
| 3,327,120 | 6/1967 | Weiss | 250/71X |
| 3,345,531 | 10/1967 | Sheldon | 250/71X |
| 3,408,143 | 10/1968 | Mueller | 95/12.2X |
| 3,478,661 | 11/1969 | Heckscher | 95/12.20 |

Primary Examiner—Samuel S. Matthews
Assistant Examiner—Monroe H. Hayes
Attorneys—Harry A. Herbert, Jr. and Arsen Tashjian ABSTRACT: A method and an apparatus for taking color photographs of subjects at very low light levels. A photo-electronic imaging system, including a color encoding filter, an image intensifier tube, and associated optical components is used to form an image of the subjects on black and white film. The film is developed and the resulting transparency then is projected through a decoding filter and associated optical components to form a color image which, if made to impinge upon color film and the film thereafter is developed and printed, results in a color photograph.

PATENTED MAY 25 1971 3,580,151

INVENTORS
KENNETH C. HUDSON
FRED E. SHASNOUA
BY Harry A. Herbert Jr.
Arsen Tashjian
ATTORNEYS

LOW LIGHT LEVEL COLOR PHOTOGRAPHY

BACKGROUND OF THE INVENTION

This invention relates to the photographing of subjects at very low light levels and, more particularly, to the taking of color photographs of such subjects.

In the prior art there are a number of well known methods for taking color photographs of subject at very low light levels, such as starlight and moonlight illumination. All of these methods, and the apparatuses relative thereto, have in common use of multistage image intensifier tubes, with varying but limited success due to individual inherent restrictions.

Some of the more prevalent methods, and their respective shortcomings, are: (a) an image intensifier tube is used for each color desired (or, more often, for the primary additive colors of red, green, and blue) to form color separation negatives or a color image on color film. This method is expensive, bulky, slow and, more often than not, registration is a problem; (b) color strips are positioned in front of and behind the image intensifier tube, with the resultant image recorded on color film. This method results in poor resolution and in lack of purity and, also, is slow; (c) color segmented wheels are located in front of and behind the image intensifier tube and are rotated in synchronization, with the resultant image recorded on color film. However, the means for rotating the wheels, and the wheels themselves, make this method cumbersome, at best.

Our invention, although also making use of an image intensifier tube, eliminates the disadvantages of existing low light level color photographing methods and apparatuses and, therefore, results in a significant advance in the state-of-the-art. Additionally, our invention results in the formation of a color image of the subject with the result that the image may be projected and viewed without the necessity of recording the image on color film. Thereby, the state of the art is further advanced.

SUMMARY OF THE INVENTION

Our invention is particularly well-suited for use in taking color photographs of subjects at very low light levels.

Thus, an object of this invention is to provide a means for taking color photographs at very low light levels.

Another object of this invention is to permit the taking of photographs of colored subjects, at very low light levels, on black and white film, whereupon the black and white image is in fact encoded for chromatic values.

Still another object of this invention is to provide a means for the projection of the encoded black and white image in such a manner that the encoded image is decoded and a color image is produced and can be viewed.

A further object of this invention is to recreate by image and by color photograph the original color values of the colored subject which has been photographed.

A still further object of this invention is to accomplish all of the foregoing objects economically and efficiently.

These, and still other, objects of our invention will become readily apparent after a consideration of the description of the invention and reference to the drawings.

DESCRIPTION OF THE PREFERRED EMBODIMENT

Our invention includes, in essence, an encoding exposure system and a decoding projection system. The encoding exposure system is the photographic taking means of our invention. The decoding projection system is the projection means of our invention.

Figure 1:
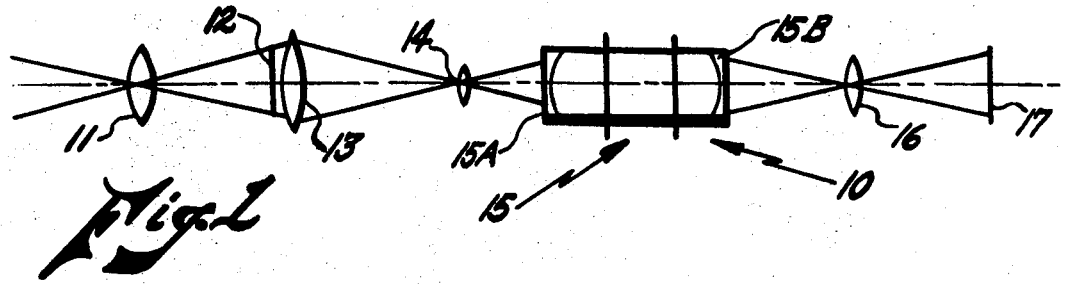
FIG. 1 is a schematic representation, in side elevation, of the optical geometry of a preferred embodiment of the photographic taking means of our invention.

With reference to FIG. 1, the encoding exposure system, i.e., the photographic taking means, 10 includes objective lens 11, field lens 13, encoding filter 12 interposed between lens 11 and field lens 13, image reducing lens 14, 3 stage image intensifier tube 15, imaging lens 16, and black and white film 17. The optical axes of lens 11, field lens 13, image reducing lens 14, image intensifier tube 15 and imaging lens 16 are coincident. Black and white film 17 is located at the focal plane of imaging lens 16. The colored subject to be photographed is not shown.

Figure 2:
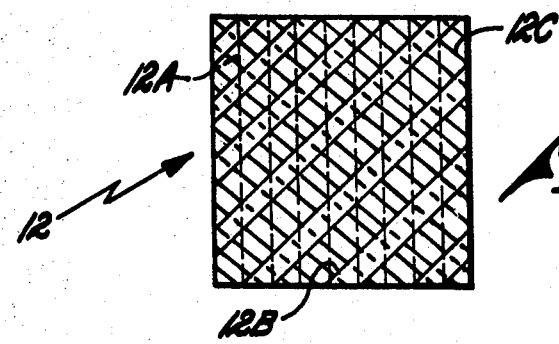
FIG. 2 is a front elevation view, in schematic form, of the encoding filter used in the embodiment shown in FIG. 1.

FIG. 2 shows, in front elevation and in schematic form, encoding filter 12. The line patterns on encoding filter 12 are, essentially, the result of the superimposition of three sets of subtractive primary color bars (i.e., cyan 12A, magenta 12B and yellow 12C), at angles to each other, as indicated. The cyan filter bars 12A are in a vertical position; the magenta filter bars 12B are approximately at 45° to the cyan filter bars 12A; and, the yellow filter bars 12C are approximately at 45° to the cyan filter bars 12A and perpendicular to the magenta filter bars 12B.

Figure 3:
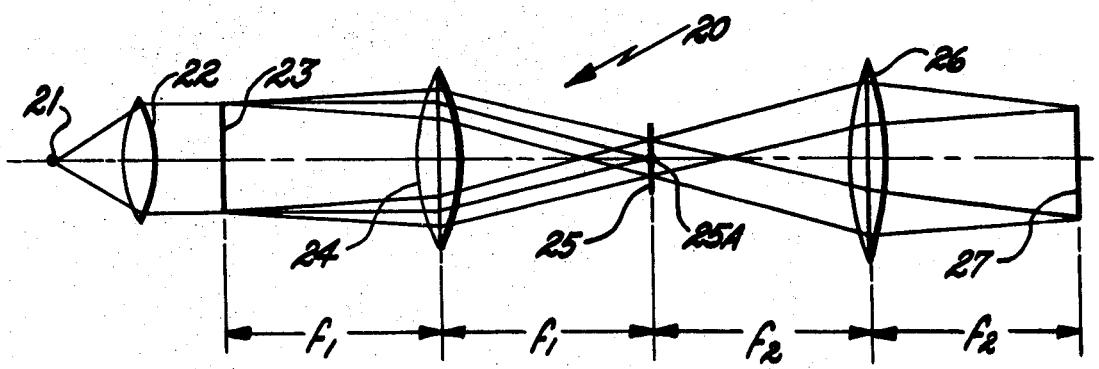
FIG. 3 is a schematic representation, in side elevation, of the optical geometry of a preferred embodiment of the projection means of our invention.

With reference to FIG. 3, the decoding projection system 20, i.e., the projection means, includes point source arc 21, collimator 22, the black and white encoded film transparency 23, lens 24, a decoding filter 25, lens 26, and color film 27. The optical axes of collimator 22, lens 24, and lens 26 are coincident. Color film 27 is located at the focal plane of lens 26.

Figure 4:
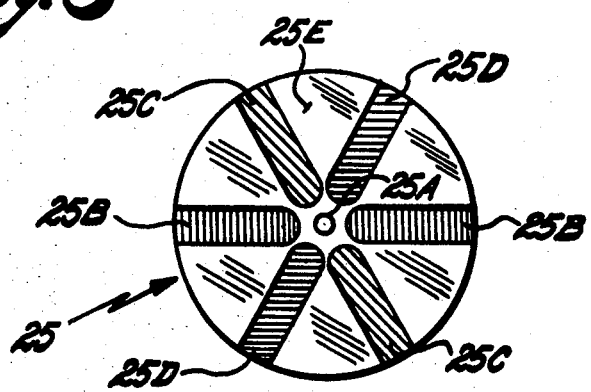
FIG. 4 is a front elevation view, in schematic form, of the decoding filter used in the embodiment shown in FIG. 3.

FIG. 4 shows, in front elevation and in schematic form, decoding filter 25 which has a central opaque portion 25A and a plurality of red 25B, green 25C, and blue 25D light filter portions or slots, positioned as indicated, in an otherwise opaque holder 25E.

MODE OF OPERATION OF THE PREFERRED EMBODIMENT

The mode of operation of the preferred embodiment can be better understood and appreciated if the subject to be photographed is assumed to have, or more technically to reflect, each of the three additive primary colors, i.e., red, green and blue. Accordingly, such an assumption is made, although neither the subject nor its reflective capabilities are shown in any of the drawings.

The subject to be photographed is imaged and focused by objective lens 11, FIG. 1. Said image impinges upon encoding filter 12, FIGS. 1 and 2, which is at the focus of lens 11, FIG. 1, and which is in very close proximity to field lens 13, FIG. 1. Filter 12 "encodes" or "screens" the red colored portion of the image because of the cyan bars, the green colored portion because of the magenta bars, and the blue colored portion because of the yellow bars. The light from the encoded image transmitted by filter 12 is then collected by field lens 13 so as to converge upon image reducing lens 14. In this way all the light transmitted by the filter 12 reaches the image formed by lens 14. The reduced encoded image is focused upon the input face 15A, i.e., the photocathode, of image intensifier tube 15 wherein the image is intensified (i.e., amplified in light level). The resultant intensified encoded image at the output face 15B, i.e., the phosphor face of image intensifier tube 15 is then focused on black and white film 17 by lens 16.

The black and white film 17 is then developed by suitable means and a transparency 23, FIG. 3, is obtained. Transparency 23 is then interposed between collimator 22, FIG. 3, and lens 24, FIG. 3, and is illuminated by point source arc 21, FIG. 3. The resultant image impinges upon decoding filter 25, FIGS. 3 and 4, which is located at the focus of lens 24.

Because of its structure, and also because of its orientation, decoding filter 25 selectively transmits the encoded colors to lens 26 which focuses the now-decoded colors, and the resultant color image, onto color film 27. With suitable development a color photograph is, thereafter, obtained.

It is here to be noted that since the subject photographed was assumed to be reflecting the three primary colors of red, green and blue, all three colors were present in the image projected onto color encoding filter 12, FIGS. 1 and 2. Therefore, the white light from point source arc 21, FIG. 3, is dispersed and diffracted into all six color filter slots 25B, 25C, 25D of decoding filter 25, FIGS. 3 and 4, with the final color image containing all three colors in proportions of brightness, hue and saturation similar to, and necessary to reproduce, the original colors reflected by the subject photographed.

It is emphasized that our invention does not involve, and is not related to, those methods and apparatuses by which color photographs or color images are produced from black and white photographic film transparencies by arbitrarily assigning chromatic values to the varying degrees of black and white, i.e. grey, intensities and densities. The color images and color photographs produced by these methods and these apparatuses do not reproduce the original colors of the subject photographed. Our invention does.

While there has been shown and described the fundamental features of our invention, as applied to a preferred embodiment, it is to be understood that various substitutions and omissions may be made by those skilled in the art without departing from the spirit of the invention. For example: if a very fine line spacing encoding filter is placed in contact with a fiber optics input to the intensifier, the field lens 13, FIG. 1, and the image reducing lens 14, FIG. 1, are not required.

We claim:

1. The method of taking color photographs at very low light levels, comprising the steps of:
   a. focusing the image of the colored subject to be photographed;
   b. filtering and transmitting said focused image through a filter having, in superimposition and at predetermined angles to each other, filter bars of cyan, magenta, and yellow, respectively;
   c. collecting, with a field lens, the light transmitted through said filter in order to converge all the light to an image reducing lens;
   d. reducing, with said image reducing lens, said filtered and transmitted image;
   e. focusing, with said image reducing lens, said reduced, filtered and transmitted image upon the photocathode input face of an image intensifier tube;
   f. intensifying the image with said image intensifier tube;
   g. directing said intensified image from the phosphor output face of said image intensifier tube so as to impinge upon an imaging lens;
   h. focusing, with said imaging lens, said intensified image upon black and white photographic film;
   i. developing said black and white photographic film;
   j. projecting the image of said developed black and white film upon a filter having filter portions of red, green and blue, respectively, in an opaque holder;
   k. focusing said filtered image on to colored photographic film;
   l. and, developing and printing said colored photographic film.

2. A system for taking color photographs at very low light levels, comprising:
   a. means for focusing the image of the colored subject to be photographed;
   b. a filter, disposed rearward of said focusing means, having line patterns resulting from the superimposition of color filter bars of cyan, magenta and yellow, respectively, at predetermined angles to each other;
   c. a field lens, disposed rearward of said filter;
   d. an image reducing lens, disposed rearward of said field lens;
   e. a three stage image intensifier tube, disposed rearward of said image reducing lens;
   f. means, disposed rearward of said three stage intensifier tube, for focusing the resultant intensified image upon black and white photographic film, with said film thereafter being developed to form a transparency of the image;
   g. means for projecting the image formed on the transparency on to color photographic film, with said color photographic film thereafter being developed and printed to form a color photograph;
   h. and, means, disposed between the black and white film transparency and the color photographic film, for focusing the image formed on the transparency on to means for filtering the transparency image, with said filtering means including an opaque filter holder having radially disposed filter slots of red, green, blue, red, green and blue, respectively, equally spaced from each other.